United States Patent [19]
Binzen

[11] Patent Number: 4,609,321
[45] Date of Patent: * Sep. 2, 1986

[54] ROTARY CAR DUMPER WITH DUST COLLECTION SYSTEM

[75] Inventor: Willard Binzen, Gibsonia, Pa.

[73] Assignee: Dravo Corporation, Pittsburgh, Pa.

[*] Notice: The portion of the term of this patent subsequent to Oct. 30, 2001 has been disclaimed.

[21] Appl. No.: 665,783

[22] Filed: Oct. 29, 1984

[51] Int. Cl.$^4$ ............................................. B65G 67/50
[52] U.S. Cl. .................................. 414/291; 414/303; 414/359; 414/371; 414/581; 414/576
[58] Field of Search ................ 414/291, 303, 359–361, 414/371, 372, 576–583

[56] References Cited

U.S. PATENT DOCUMENTS

| | | |
|---|---|---|
| 2,215,735 | 9/1940 | Jones . |
| 2,575,869 | 11/1951 | Flowers . |
| 2,659,500 | 11/1953 | Kincaid . |
| 4,020,956 | 5/1977 | Van Hille . |
| 4,479,749 | 10/1984 | Binzen ................................ 414/291 |

FOREIGN PATENT DOCUMENTS

| | | |
|---|---|---|
| 122565 | 9/1979 | Japan . |
| 22614 | of 1898 | United Kingdom . |
| 418418 | 7/1974 | U.S.S.R. . |
| 652071 | 3/1979 | U.S.S.R. . |

OTHER PUBLICATIONS

Dravo, Sample Sketch of Current Practice, p. 6.

*Primary Examiner*—Frank E. Werner
*Attorney, Agent, or Firm*—Parmelee, Miller, Welsh & Kratz

[57] ABSTRACT

The dust collection units in a rotary railroad car dumper installation are mounted over the hopper pit along one or both sides of the cylindrical, rotatable dumper frame so that dust ladened air can be sucked directly into the dust collection units without the need for duct work and the collected dust can be returned directly to the pit without the need for easily clogged screw conveyors and small chutes. A fixed enclosure means encloses the top and sides of the dumper frame and form with air shields mounted on the cylindrical dumper frame, a rotary valve which restricts flow such that ambient air is sucked into the hopper pit by the duct collection units at velocities which exceed the capture velocity of the dust clouds created by dumping of the contents of the car.

5 Claims, 2 Drawing Figures

ROTARY CAR DUMPER WITH DUST COLLECTION SYSTEM

BACKGROUND OF THE INVENTION

The present invention is similar to that disclosed in my copending application, U.S. Ser. No. 382,780, filed on May 27, 1982, now U.S. Pat. No. 4,479,749. The invention relates to apparatus for emptying railroad cars carrying bulk material by rotating them about their longitudinal axis to dump the contents over the sides of the cars into a hopper below. More particularly, it relates to such a rotary card dumper which incorporates an efficient, simplified dust collection system to contain the clouds of dust created by the dumping operation.

It is common practice to empty trainloads of bulk material by cycling the cars through a cylindrical frame which is rotated about a horizontal axis to dump the contents over the side of the car into a hopper underneath the rotatable frame. During the dumping operation billowing clouds of dust are usually created. While this was not considered a problem in earlier times, recent concern for the environment and for working conditions has resulted in steps being taken to contain these dust clouds. Under present practice, dust collectors are installed adjacent to the dumper structure on a separate foundation. This arrangement requires ducting of the dust ladened air from the hopper pit to the dust collectors as well as ducting of the cleaned air to the exhaust fans.

Because of the billowing nature of the dust clouds created during dumping, it is necessary that the duct system draws air into the openings around the hopper pit area at a rate which exceeds the dust capture velocity. That is, at a velocity which prevents puffs of dust from escaping through these openings and into the dumper building. This is difficult to achieve with the present ducted system and, in any event, requires large volume exhaust fans to maintain capture velocity across all of the air entrance areas. This in turn requires increased horsepower to satisfy duct losses which approach 50% of the designed horsepower requirement. The placement of the dust collectors on a separate foundation also requires that the dust collected in the dust collector hoppers must be transported back to the dumper pit through a maze of screw conveyors, rotary valves and chutes; all of which require constant maintenance. Some materials tend to cake which can plug up the system, especially at the screw conveyors, rotary valves and small ducts. Furthermore, the duct work which handles the dust ladened air is subject to wear at all points where the duct changes direction. These points also require frequent maintenance.

SUMMARY OF THE INVENTION

According to the present invention, the open area around the dumper pit of a rotary railroad car dumper is controlled so that capture velocity for the billowing dust clouds created by dumping can be maintained across all of the open areas without requiring excessively large exhaust fans. However, the object is not to eliminate all the openings since some air flow is desirable and necessary to help sweep the dust cloud from the pit. By controlling the location as well as the area of the openings, efficient dust collection can be realized.

Apparatus according to the present invention is suitable for use with car dumpers already in service or in new installations. Such existing dumpers include a cylindrical frame constructed of two end rings joined by elongated members with a section of railroad track extending through the frame parallel to its longitudinal axis. Such rotatable frames are closed on the circular ends with end plates, except for an opening through which the railroad car enters and leaves the frame and are open on the sides.

In order to capture the dust created when the contents of the railroad car are dumped into the dumper pit located under the rotatable frame, the present invention provides in a preferred embodiment fixed position enclosure means, in the shape of a partial cylinder extending along the top and along each side of the rotatable frame between the end rings to enclose the space between the sides and top of the dumper pit and the sides and top of the rotatable, cylindrical frame. Planar air shields mounted in several positions on the rotatable frame and extending between the end rings parallel to the longitudinal axis of the frame are arranged to form with the enclosure means, as the frame is rotated, a rotary valve which restricts and directs the air flow above and around the dumper pit and within the frame such that ambient air is sucked predominantly through the openings in the end ring plates by dust collection means at a velocity which exceeds the capture velocity of the dust cloud created by dumping of the railroad car contents. The dust collection means may be mounted on opposite sides of the fixed position enclosure means. Alternatively, the dust collection means may be mounted on only one side of the fixed position enclosure means with an air flow damper mounted on the opposite side. In a further embodiment, the cylindrically shaped, fixed position enclosure means is partially open at the top to provide yet another way to control the air flow paths to the dust collection means.

The shield members on the rotatable from preferably include a plurality of planar members extending substantially from the frame of the track section outward to substantially the cylindrical surface of the fixed position enclosure means. These planar members form with the fixed position enclosure means a restriction to the flow of ambient air into the dumper pit at selected points during the rotation of the rotatable frame and also direct the pattern of air flow within the rotatable frame to prevent a so-called short circuiting of air flow to the dust collection means.

The air shields also include three planar members which lie in the plane of the rails, one positioned between the rails and each of the other two are positioned on the outside of the rails. These three rail bed planar members form a restriction to the flow of ambient air into and from the dumper pit through the air passage ways 9 in the end plates 7 and through the rail bed. These three rail bed planar members further prevent the short circuiting type of air flow and generally assist in establishing a clockwise flow of air within the dumper frame.

DETAILED DESCRIPTION OF THE INVENTION

Figure 1:
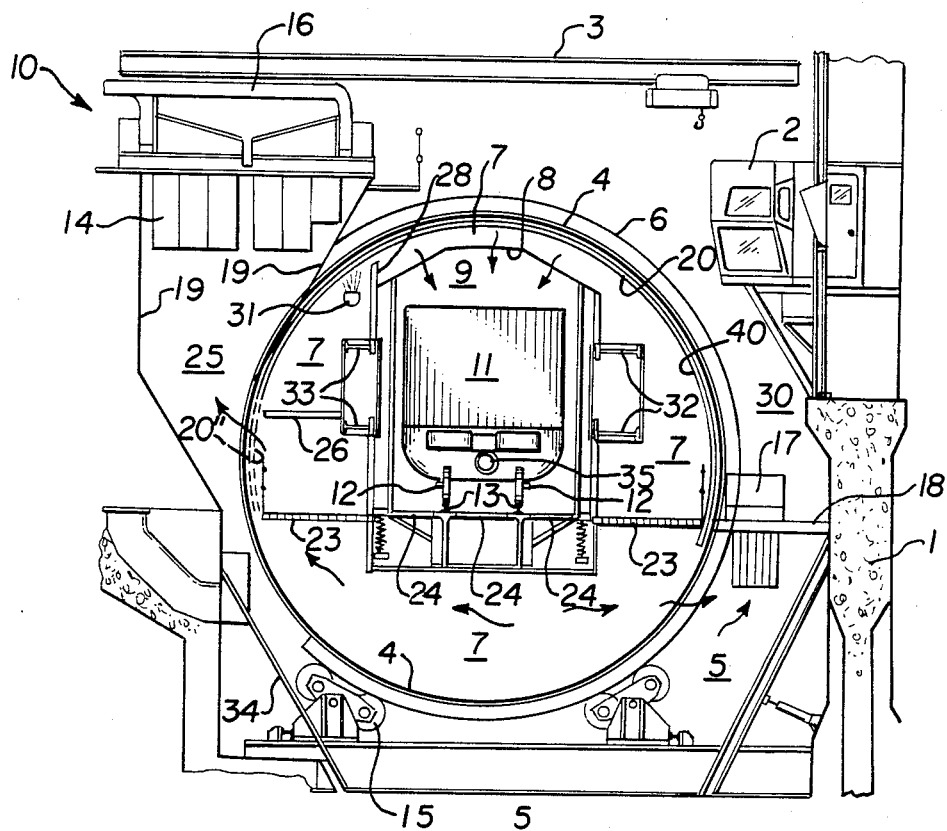
FIG. 1 is an end view of a rotary car dumper installation incorporating the subject invention.
Figure 2:
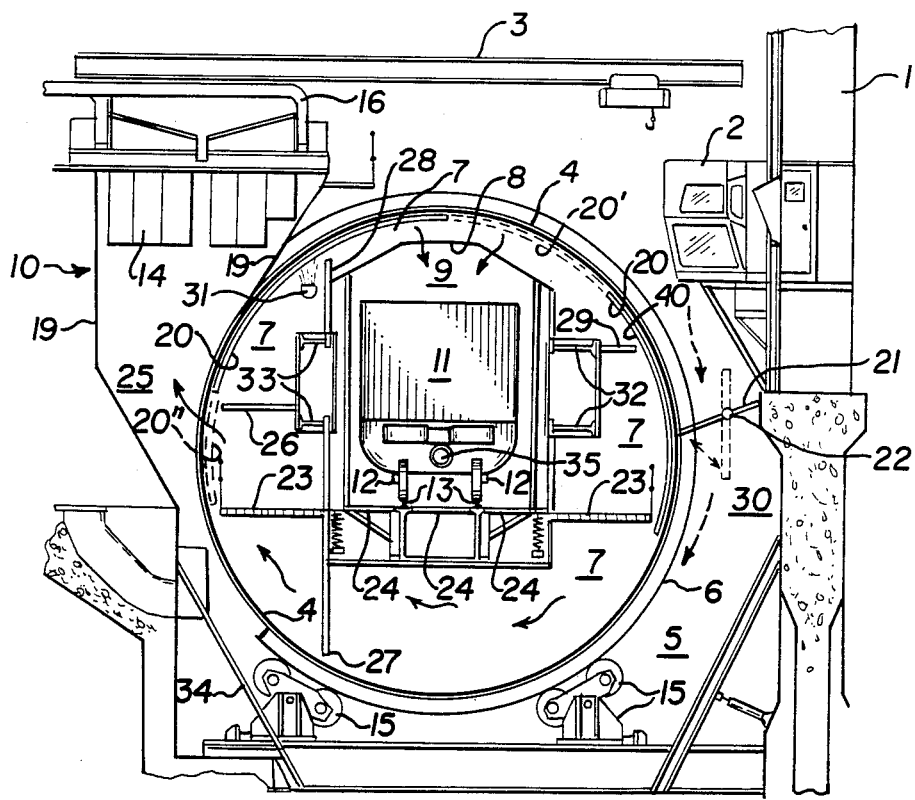
FIG. 2 is an end view similar to the view shown in FIG. 1 incorporating an alternate embodiment of the subject invention.

As illustrated in FIGS. 1 and 2, a car dumper installation, generally designated 10 and incorporating the present invention, includes a hopper pit 5, which may be circular or rectangular in plan view, and a cylindrical, rotatable frame 4. The installation may be housed in an enclosed structure 1, having an operator's cab 2, a crane 3, and like well known appurtenances. The frame 4 is constructed of a pair of horizontally spaced end rings 6 interconnected by a number of girders 32 and 33 which also support a section of railroad track 13. The details of such a frame are well known in the art. Sufficient to say that the cylindrical frame is open at the sides but is enclosed at the ends by end plates 7 which are provided with openings 8 through which a railroad car 11 with wheels 12 can pass. For ease of illustration, one of the end plates 7 is removed in FIGS. 1 and 2. The openings 8, above the rail car 11, provide an air passage way 9 to permit the flow of ambient air through end plates 7 to the interior of the cylindrical frame 4.

The cylindrical frame 4 is mounted for rotation about its longitudinal axis, which passes through the coupling 35, by a pair of trunnions 15 under each end ring 6. The frame 4 is rotated by motor gear reducer combination (not shown) which also bears against the end rings in conventional fashion.

With the frame 4 in the upright position shown in FIG. 1, the track section 13 is aligned with an external track system (not shown) which may extend from one or both ends of the dumper so that the railroad car 11 can be positioned in the frame 4. It is common practice, but is not essential to the present invention, to provide the cars with rotatable couplings 35 and to position the track section 13 in the frame 4 with the coupling axis coextensive with the longitudinal axis of the frame so that the cars can be individually rotated to dump their contents without uncoupling them from a train of cars. The car 11 is held in position on the track section 13 during rotation of the frame 4 by a set of clamps (not shown), as is all well known in the art. As the frame is rotated about the longitudinal axis by the motor gear reducer units, for instance in the clockwise direction as viewed in FIGS. 1 and 2, the contents of the car are dumped over one side into the hopper pit 5. The bulk material, such as coal, is dumped into the pit and received by hoppers (not shown) for disposition by take away equipment (not shown) in a well known manner.

Dumping of most bulk materials into the hopper pit 5 creates billowing clouds of dust. In order to contain this dust, a number of dust collection units 14 and 17 are mounted along one or both sides of the rotating frame 4. These dust collection units may be, for instance, bag type dust collectors. The number of units is related to the capacity of the selected units and the total demand of the installation. The dust collection units 14 and 17 have bottom intakes such that they may be mounted over one or both of the air draft channels 25 and 30 formed on either side of frame 4 for direct intake of dust ladened air. With this arrangement dust collected by these units can be dumped directly into the hopper pit 5 during the dust collector cleaning cycle. Baffle plate 34, and enclousure 19 close off the peripheral openings between the hopper pit 5 and the bottom of the dust collector unit 14 and also direct the collected dust toward the center of the pit. Additional baffles may be employed to close off the openings between the pit and the dust collection units on each side of the cylindrical frame 4 such that there are two distinct air draft channels 25 and 30 formed on either side of the frame 4.

In my copending application, Ser. No. 382,780, the top of the rotatable cylindrical frame 4 is open, while the dust collector means and various baffles form a fixed enclosure around the sides thereof. In the several embodiments of my present invention, I have found that the top and sides of the rotatable frame 4 can be uniformly enclosed by a fixed position enclosure in the form of a partial, cylindrically shaped, stationary domed shield 20. The domed shield 20 may be constructed of wood or metal.

The stationary domed shield 20 effectively blocks the air path through the sides and the top of the rotatable frame 4 and, thus, permits incoming ambient air to enter the frame 4 only through the open areas 9 in the end plates 7.

In the preferred embodiment depicted in FIG. 1, a number of dust collectors 14 and 17 are employed, one positioned in each of the air draft channels 25 and 30 on opposed sides of the frame 4. Enclosed 19 defines a first air draft channel 25 on the one side of the frame 4 while the space between the sidewall of structure 1 and the domed shield enclosure 20 defines the second air draft channel 30. The draft channels 25 and 30 are thus formed on the opposed sides of frame 4 since the domed shield 20 effectively blocks the ambient air flow path in the central region of the dumper installation. Still referring to the embodiment depicted in FIG. 1, the draft channel 30 is partially sealed off by floor 18 and dust collector 17 is mounted within the floor 18 in communication with the dust laden air in hopper pit 5. Thus, as the frame 4 rotates in a clockwise direction to the dumping position, the draft fans of dust collectors 14 and 17 cause ambient air to be sucked into the interior of the frame 4 through the open end passageways 9. Planar air shield members 26 and 28 rotate with the frame 4 and form somewhat of an air lock seal against the fixed domed shield 20. The moving shield members 26 and 28 cause the incoming ambient air entering at passageway 9 to move in a generally clockwise direction until the air reaches the bottom area of the frame 4 adjacent the pit 5 whereupon the air stream is free to split into two pathways, as indicated by the arrows in the drawings. The air stream then captures the billowing dust clouds in its path as it is drawn toward the collectors. Cleaned exhaust air then leaves the dust collector units to be vented to the atmosphere. Short circuiting of the air flow paths within frame 4 decrease the cleaning efficiency of the air handling system and it is minimized through the use of the aforementioned planar air shield 26 and 28. Short circuiting is also minimized through employment of three planar air shields 24 which block off the air passageway beneath the rails 13. The rotatable floor areas 23 extending outwardly from the rails 13 are preferably perforated to permit an unblocked air pathway to the collectors 14 and 17. The domed shield 20 may also contain a perforated section 20" at its lower edge portion to improve the exhaust draft characteristics in that area.

In the embodiment of FIG. 2, there is only one set of dust collectors 14 employed. The second air draft channel 30 contains an elongated damper plate 21 rotatably mounted on a motorized shaft 22 to regulate the flow of ambient air through the draft channel 30 and into the pit 5. When the dumper frame 4 is in the upright position shown in FIG. 2, the motorized damper 21 is, preferably, in an open position, as shown in broken lines in the drawing. As the dumper frame 4 rotates in a clockwise direction during the dumping operation, the damper 21 is slowly closed. Thus, as the bulk material begins to dump from the car 11 into the pit 5 there is some flow of air through draft channel 30 as indicated by the broken line arrows. The air flowing through damper 21 initiates a general clockwise direction for the air flow pattern around the lower region of the frame 4 in the pit 5. When the rail car 11 is in the inverted dumping position (not shown) the damper 21 is preferably fully closed so as to block off all air flow through the channel 30 to the exterior of the dumper installation. Hence, no dust laden air can escape. When damper 21 is in the closed position, all of the ambient air will be sucked into the passageway 9 through the end plates 7 to the dust collector 14. If additional air is required, it may be necessary to provide an open space 20' near the top of the domed shield 20. The opening 20' would, however, necessitate the use of additional rotatable planar air shields 27 and 29 within the frame 4 to insure that dust laden air does not leak from the opening 20' during the dumping operation.

The domed shield 20 also preferably contains a transparent section in the area indicated around 40 in order to permit the operator in cab 2 to visually inspect the inner workings of the installation. A water spray head 31 may also be provided on the rotatable frame 4 to periodically clean any dust which may accumulate on the inside of the transparent section 40. The entire operation is controlled and monitored by an operator located in the cab 2 which is cantilevered out toward the end ring 6 on one side of the rotatable frame 4. Building 1 encloses the entire dumper installation 10, including the dust collection system.

The disclosed arrangement makes a compact, effective car dumper installation. The size of the restrictions to ambient airflow are always such that dust cloud capture velocity is always exceeded without the need for unnecessarily oversized dust collection equipment. Elimination of much of the prior duct work not only lowers installation costs but it also eliminates duct losses which reduces exhaust fan capacity required and operating costs. Furthermore, collected dust can be returned directly to the hopper pit thereby eliminating the screw conveyors, rotary valves and clogged chutes associated with previous designs.

While a specific embodiment of the invention has been described in detail, it will be appreciated by those skilled in the art that various modifications and alternatives to the details of that embodiment could be developed in light of the overall teachings of the disclosure. Accordingly, the particular arrangement disclosed is meant to be illustrative only and not limiting as to the scope of the invention which is to be given the full breadth of the appended claims and any and all equivalents thereof.

I claim:

1. A rotary car dumper and dust collection apparatus comprising:

a rotatable frame comprising a pair of vertically oriented, horizontally spaced end rings connected by elongated members to form an open sided cylindrical frame with a horizontal longitudinal axis and having a section of railroad track extending through the frame parallel to said longitudinal axis, said frame including end plates at said end rings enclosing the ends of said cylindrical frame except for an opening through which a railroad car can pass through said frame on said section of track;

a hopper pit under said cylindrical frame for receiving bulk material carried by said railroad car, a portion of said cylindrical frame below said section of railroad track extending downward into said hopper pit;

means for mounting said cylindrical frame through said end rings for rotation about said longitudinal axis to dump bulk material over one side of said railroad car into said hopper pit;

fixed position enclosure means extending along each side and the top of said rotatable frame between the end rings to enclose the space between the sides of said hopper pit and the cylindrical sides of said rotatable frame, the spaces between the sides of the hopper pit and the sides of said fixed position enclosure means defining first and second air draft channels on opposed sides thereof;

dust collection means positioned in communication with at least one of said air draft channels; and planar air shields mounted on said open sided rotatable frame and extending between said end rings parallel to the longitudinal axis of said frame, said planar air shields being arranged to form with the enclosure means as said cylindrical frame is rotated to dump the contents of said railroad car into the hopper pit, a rotatable valve which forms restricted openings above the hopper pit such that ambient air is sucked through these openings by the dust collection means at a velocity which exceeds the velocity required to capture a dust cloud created in the hopper pit and below the railroad car by dumping of the railroad car contents.

2. The apparatus of claim 1 wherein the dust collection means is in communication with both of said air draft channels.

3. The apparatus of claim 1, including a damper means positioned in one of said air draft channels to regulate the air flow therethrough and said dust collection means communicating with the other of said air draft channels.

4. The apparatus of claim 3 wherein the fixed position enclosure means has an open space formed therethrough adjacent the top thereof to provide an additional ambient air flow path into the interior of the rotatable, cylindrical frame.

5. The apparatus of claim 1 wherein at least one of said air draft channels is closed-off by floor means and said dust collection means includes a dust collector unit mounted on said floor means.

* * * * *